(12) United States Patent
Li et al.

(10) Patent No.: US 10,519,788 B2
(45) Date of Patent: Dec. 31, 2019

(54) COMPOSITE AIRFOIL METAL PATCH

(71) Applicant: GENERAL ELECTRIC COMPANY, Schenectady, NY (US)

(72) Inventors: Qiang Li, Cincinnati, OH (US); Nicholas Joseph Kray, West Chester, OH (US); Scott Roger Finn, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 656 days.

(21) Appl. No.: 14/893,639

(22) PCT Filed: May 29, 2014

(86) PCT No.: PCT/US2014/039966
§ 371 (c)(1),
(2) Date: Nov. 24, 2015

(87) PCT Pub. No.: WO2015/023345
PCT Pub. Date: Feb. 19, 2015

(65) Prior Publication Data
US 2016/0341052 A1      Nov. 24, 2016

Related U.S. Application Data

(60) Provisional application No. 61/828,275, filed on May 29, 2013.

(51) Int. Cl.
*F01D 5/30*     (2006.01)
*F01D 5/28*     (2006.01)
*F04D 29/32*    (2006.01)

(52) U.S. Cl.
CPC .......... *F01D 5/3092* (2013.01); *F01D 5/282* (2013.01); *F01D 5/3007* (2013.01);
(Continued)

(58) Field of Classification Search
CPC .... F01D 5/3092; F01D 5/3007; F01D 5/3084; F04D 29/322; F04D 29/34
See application file for complete search history.

(56) References Cited

U.S. PATENT DOCUMENTS 5,160,243 A * 11/1992 Herzner .................... F01D 5/28
                                                        416/220 R
5,222,297 A     6/1993 Graff et al.
(Continued)

FOREIGN PATENT DOCUMENTS

| CN | 101344013 A | 1/2009 |
| CN | 102112702 A | 6/2011 |

(Continued)

OTHER PUBLICATIONS

Unofficial English Translation of Chinese Office Action issued in connection with corresponding CN Application No. 201480030980.8 dated Jul. 29, 2016.

*Primary Examiner* — Carlos A Rivera
*Assistant Examiner* — Cameron A Corday
(74) *Attorney, Agent, or Firm* — General Electric Company; William Scott Andes

(57) ABSTRACT

A composite airfoil comprises a leading edge and a trailing edge, a pressure side and a suction side extending between the leading edge and the trailing edge, a tip at a radial outer end of the airfoil, a shank at a radial inner end of the airfoil, a dovetail connected to the shank, and a metal patch disposed between the dovetail and the shank.

14 Claims, 7 Drawing Sheets

(52) U.S. Cl.
CPC ........ *F04D 29/324* (2013.01); *F05D 2220/36* (2013.01); *F05D 2240/30* (2013.01); *F05D 2260/941* (2013.01); *F05D 2300/174* (2013.01); *F05D 2300/6033* (2013.01)

(56) References Cited

U.S. PATENT DOCUMENTS

| | | | |
|---|---|---|---|
| 5,240,375 A * | 8/1993 | Wayte | F01D 5/28 |
| | | | 416/219 R |
| 5,279,892 A | 1/1994 | Baldwin et al. | |
| 5,375,978 A | 12/1994 | Evans et al. | |
| 5,573,377 A | 11/1996 | Bond et al. | |
| 5,785,498 A | 7/1998 | Quinn et al. | |
| 5,939,006 A | 8/1999 | Wang et al. | |
| 6,290,466 B1 * | 9/2001 | Ravenhall | F01D 5/282 |
| | | | 416/219 R |
| 6,431,835 B1 | 8/2002 | Kolodziej et al. | |
| 7,491,032 B1 | 2/2009 | Powell et al. | |
| 7,575,417 B2 | 8/2009 | Finn et al. | |
| 7,794,197 B2 | 9/2010 | Thompson et al. | |
| 7,837,446 B2 | 11/2010 | McMillan | |
| 8,033,789 B2 | 10/2011 | Read et al. | |
| 8,038,408 B2 | 10/2011 | McMillan | |
| 8,075,274 B2 | 12/2011 | Carvalho | |
| 8,100,662 B2 | 1/2012 | Schreiber | |
| 8,206,118 B2 | 6/2012 | Propheter-Hinckley et al. | |
| 9,039,379 B2 * | 5/2015 | Radomski | F01D 5/282 |
| | | | 416/220 R |
| 9,157,330 B2 * | 10/2015 | Garin | F01D 5/3084 |
| 2009/0016890 A1 | 1/2009 | Douguet et al. | |
| 2009/0025365 A1 | 1/2009 | Schilling et al. | |
| 2009/0035131 A1 | 2/2009 | McMillan | |
| 2009/0060745 A1 | 3/2009 | Douguet et al. | |
| 2010/0189562 A1 | 7/2010 | Blanchard et al. | |
| 2010/0229334 A1 | 9/2010 | Conrad | |
| 2010/0296939 A1 | 11/2010 | Jevons | |
| 2010/0296942 A1 | 11/2010 | Jevons | |
| 2011/0027096 A1 | 2/2011 | Northfield | |
| 2011/0049297 A1 | 3/2011 | Jevons et al. | |
| 2011/0070092 A1 | 3/2011 | Gerlach | |
| 2011/0129348 A1 | 6/2011 | Parkin et al. | |
| 2011/0176927 A1 | 7/2011 | Alexander et al. | |
| 2011/0182741 A1 | 7/2011 | Alexander | |
| 2011/0182743 A1 | 7/2011 | Naik | |
| 2011/0194941 A1 | 8/2011 | Parkin et al. | |
| 2011/0206530 A1 | 8/2011 | Fabre | |
| 2011/0217166 A1 | 9/2011 | McMillan | |
| 2011/0217170 A1 | 9/2011 | Buffone et al. | |
| 2011/0217172 A1 | 9/2011 | Fabre et al. | |
| 2011/0217517 A1 | 9/2011 | McMillan et al. | |
| 2011/0223027 A1 | 9/2011 | Klinetob et al. | |
| 2012/0003100 A1 | 1/2012 | James et al. | |
| 2013/0004322 A1 | 1/2013 | Schwarz et al. | |

FOREIGN PATENT DOCUMENTS

| | | |
|---|---|---|
| EP | 2511478 A1 | 10/2012 |
| WO | 9641068 A1 | 12/1996 |

* cited by examiner

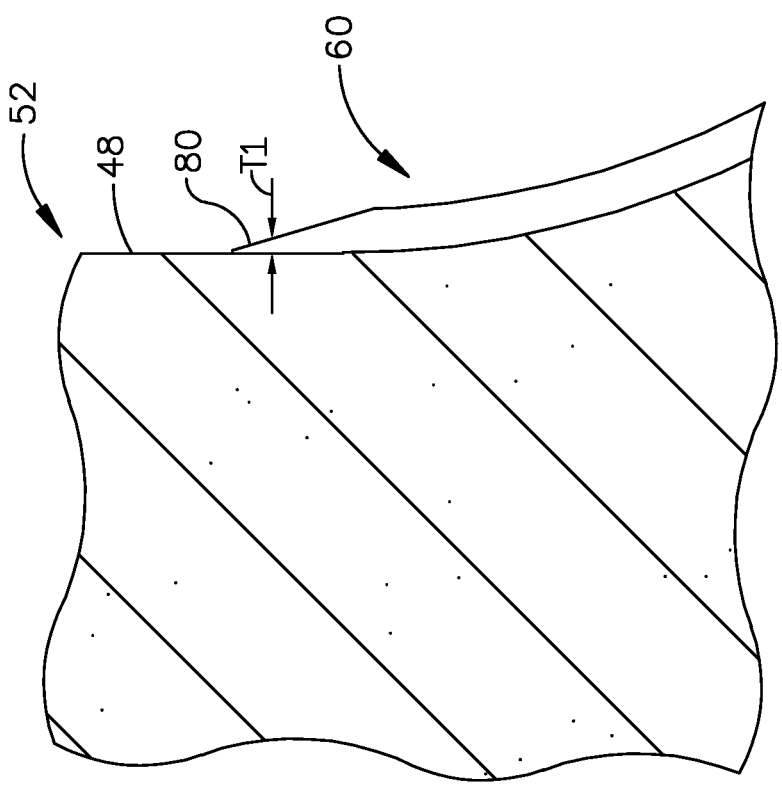

COMPOSITE AIRFOIL METAL PATCH

CROSS-REFERENCE TO RELATED APPLICATIONS

This PCT utility application claims priority to and benefit from currently pending provisional application having U.S. Patent Application Ser. No. 61/828,275, titled "Composite Airfoil Metal Patch" and having filing date May 29, 2013, all of which is incorporated by reference herein.

BACKGROUND

Present embodiments relate generally to gas turbine engines. More specifically, but not by way of limitation, present embodiments relate to composite airfoils having a metal patch structure located on one or both of an airfoil shank and dovetail.

A typical gas turbine engine generally possesses a forward end and an aft end with its several core or propulsion components positioned axially therebetween. An air inlet or intake is located at a forward end of the engine. Moving toward the aft end, in order, the intake is followed by a compressor, a combustion chamber, and a turbine. It will be readily apparent to those skilled in the art that additional components may also be included in the engine, such as, for example, low-pressure and high-pressure compressors, and low-pressure and high-pressure turbines. This, however, is not an exhaustive list.

The compressor and turbine generally include rows of airfoils that are stacked axially in stages. Each stage includes a row of circumferentially spaced stator vanes and a row of rotor blades which rotate about a center shaft or axis of the turbine engine. The turbine engine may include a number of stages of static air foils, commonly referred to as vanes, interspaced in the engine axial direction between rotating air foils commonly referred to as blades. A multi-stage low pressure turbine follows the two stage high pressure turbine and is typically joined by a second shaft to a fan disposed upstream from the compressor in a typical turbo fan aircraft engine configuration for powering an aircraft in flight.

An engine also typically has an internal shaft axially disposed along a center longitudinal axis of the engine. The internal shaft is connected to both the turbine and the air compressor, such that the turbine provides a rotational input to the air compressor to drive the compressor blades. The first and second rotor disks are joined to the compressor by a corresponding rotor shaft for powering the compressor during operation.

In operation, air is pressurized in a compressor and mixed with fuel in a combustor for generating hot combustion gases which flow downstream through turbine stages. The turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. The stator nozzles turn the hot combustion gas in a manner to maximize extraction at the adjacent downstream turbine blades. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy.

Due to extreme temperatures of the combustion gas flow path and operating parameters, the stator vanes and rotating blades in both the turbine and compressor may become highly stressed with extreme mechanical and thermal loading. Additionally, gas turbine engines often comprise turbofans which provide thrust. These turbofans also utilize airfoils to cause air movement from the forward toward the aft end of the engine and due to operating temperatures may be formed of lightweight composites.

One known means for increasing performance of a turbine engine is to increase the operating temperature of the engine, which allows for hotter combustion gas and increased extraction of energy. Additionally, foreign objects occasionally pass by these components with airflow. However a competing goal of gas turbine engines is to improve performance through weight reduction of components in the engine. One means of reducing weight of engine components is to reduce weight through the use of composite materials.

One desirable characteristic or design of gas turbine engines is to improve performance of airfoil structures. This may occur in a variety of fashions including use of composite materials. However, airfoils are often subjected to large centrifugal loads at steady state condition. The stress concentrations located at the upper end of the dovetail and lower end of the shank are often limiting factors for composite blade life and durability.

As may be seen by the foregoing, it would be desirable to overcome these and other deficiencies with gas turbine engine components. More specifically, it would be desirable to overcome these deficiencies to improve life and durability of airfoils by reducing stress concentration and improving resistance to fatigue.

The information included in this Background section of the specification, including any references cited herein and any description or discussion thereof, is included for technical reference purposes only and is not to be regarded subject matter by which the scope of the invention is to be bound.

SUMMARY

According to aspects of the present embodiments, a composite airfoil is provided with a metal patch on at least one of the airfoil shank or the dovetail. The composite airfoil may be utilized at various locations within the gas turbine engine.

A composite airfoil comprises a leading edge and a trailing edge, a pressure side and a suction side extending between the leading edge and the trailing edge, a tip at a radial outer end of the airfoil, a shank at a radial inner end of the airfoil, a dovetail connected to the shank, and a metal patch disposed between the dovetail and the shank.

Optionally, the composite airfoil further comprises a shim disposed between the dovetail and a disk. The composite airfoil further comprises a wear strip disposed between the shim and the dovetail. The wear strip may be disposed on a composite portion of the dovetail or the wear strip may be disposed on the metal patch. The metal patch may comprise a first metal patch on the suction side and a second metal patch on the pressure side. The metal patch may be located in a transition region between the dovetail and the shank. The metal patch may be of constant thickness or of varying thickness. The metal patch may be a titanium alloy. The airfoil may be a fan blade, a turbine blade or a compressor blade. The metal patch may be bonded to the dovetail. The shim may be formed of either a single material or two materials and may have either a soft side or a hard side This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the invention may be gleaned from the disclosure herein. Therefore, no limiting interpretation of this summary is to be understood without further reading of the entire specification, claims and drawings included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE ILLUSTRATIONS

The above-mentioned and other features and advantages of these exemplary embodiments, and the manner of attaining them, will become more apparent and the composite airfoil with metal patch will be better understood by reference to the following description of embodiments taken in conjunction with the accompanying drawings, wherein:

FIG. 4A is an enlarged section view of thickness of metal patch of FIG. 4;

DETAILED DESCRIPTION

Figure 1:
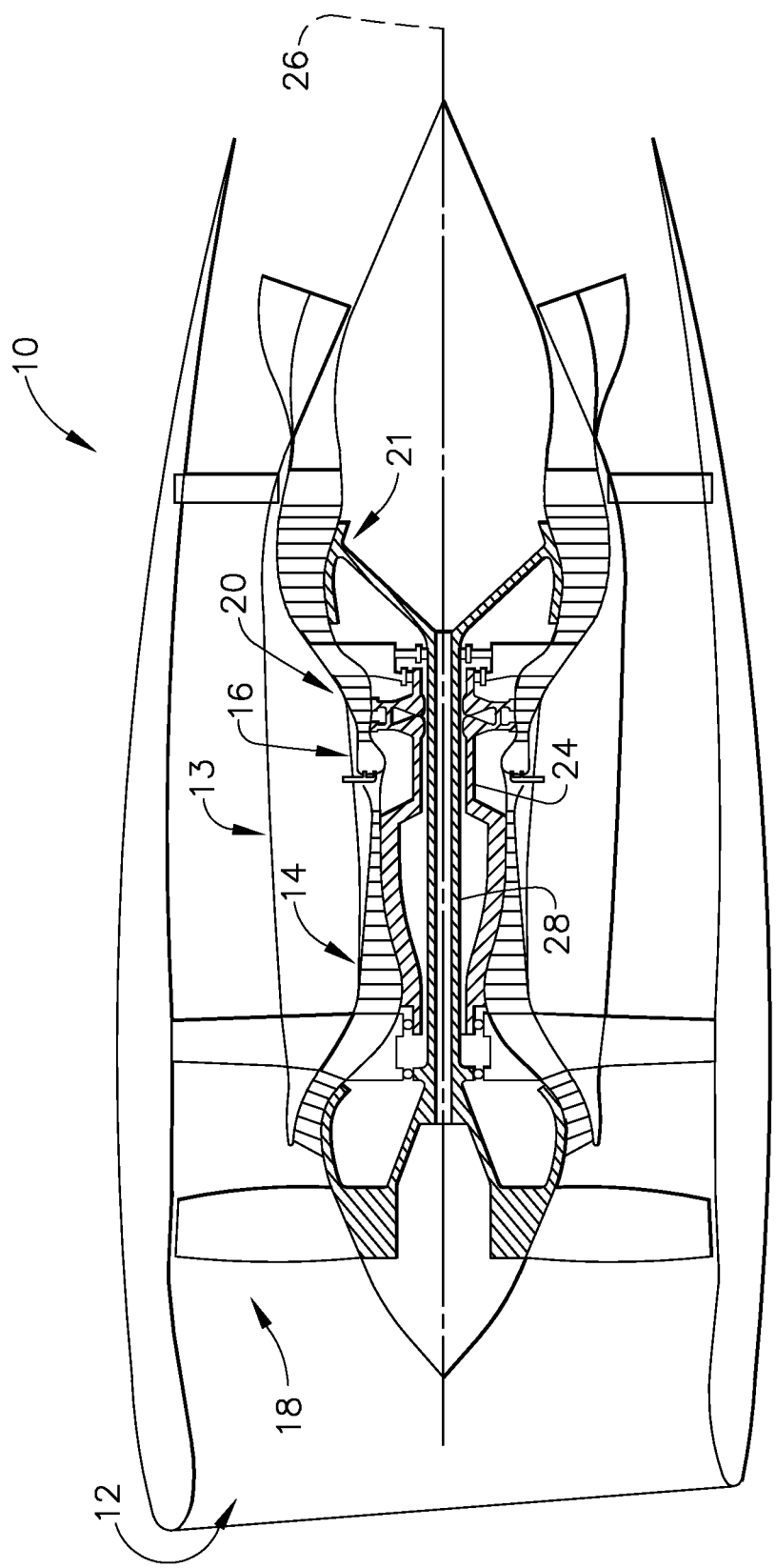
FIG. 1 is a schematic side section view of a gas turbine engine for an aircraft.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-6 various embodiments of composite airfoils are depicted with metal patches. The composite airfoil may be utilized at various locations of a gas turbine engine including, but not limited to, a fan, a compressor and a turbine, both blades and vanes. The metal patch may be utilized with shims and optionally with wear strips between the patch and the shim. The metal strips or patches are located at key stress concentration locations and decrease stress concentration levels by re-distributing loads and reducing flatwise tensile stress. As a result, the metal patch will improve fatigue life of the fan blade.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions.

Present embodiments provide an airfoil which may be formed of various layers of material. For example, one material may be a polymeric matrix composite (PMC). According to a second embodiment, the material may be a ceramic matrix composite (CMC). Other materials may use, as described further herein, such as carbon based materials, for example, and therefore the description should not be considered limiting.

Referring initially to FIG. 1, a schematic side section view of a gas turbine engine 10 is shown. The function of the turbine is to extract energy from high pressure and temperature combustion gases and convert the energy into mechanical energy for work. The turbine engine 10 has an inlet end 12 wherein air enters the core or propulsor 13 which is defined generally by a compressor 14, a combustor 16 and a multi-stage high pressure turbine 20. Collectively, the propulsor 13 provides thrust or power during operation. The gas turbine engine 10 may be used for aviation, power generation, industrial, marine or the like.

In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. A low pressure turbine 21 may also be utilized to extract further energy and power additional compressor stages. The low pressure air may be used to aid in cooling components of the engine as well.

Referring still to FIG. 1, the inlet 12 includes a turbofan 18 having a plurality of blades. The turbofan 18 is connected by shaft 28 to the low pressure turbine 21 and creates thrust for the turbine engine 10. Although discussed with respect to the various blades of the fan 18, the multi-material airfoil may be utilized with various airfoils within the turbine engine 10. Additionally, the multi-material blade may be utilized with various airfoils associated with structures other than the turbine engine as well.

The airfoil assemblies 30 (FIG. 2) may be adapted for use at various locations of the engine 10 (FIG. 1). For example, the assembly 30 may be utilized at the fan 18. The assembly 30 may be used within the compressor 14. Further, the assembly 30 may be utilized within the turbine 20. Moreover, the assembly 30 may be utilized with stationary vanes or moving blades, either of which have airfoil shaped components.

Figure 2:
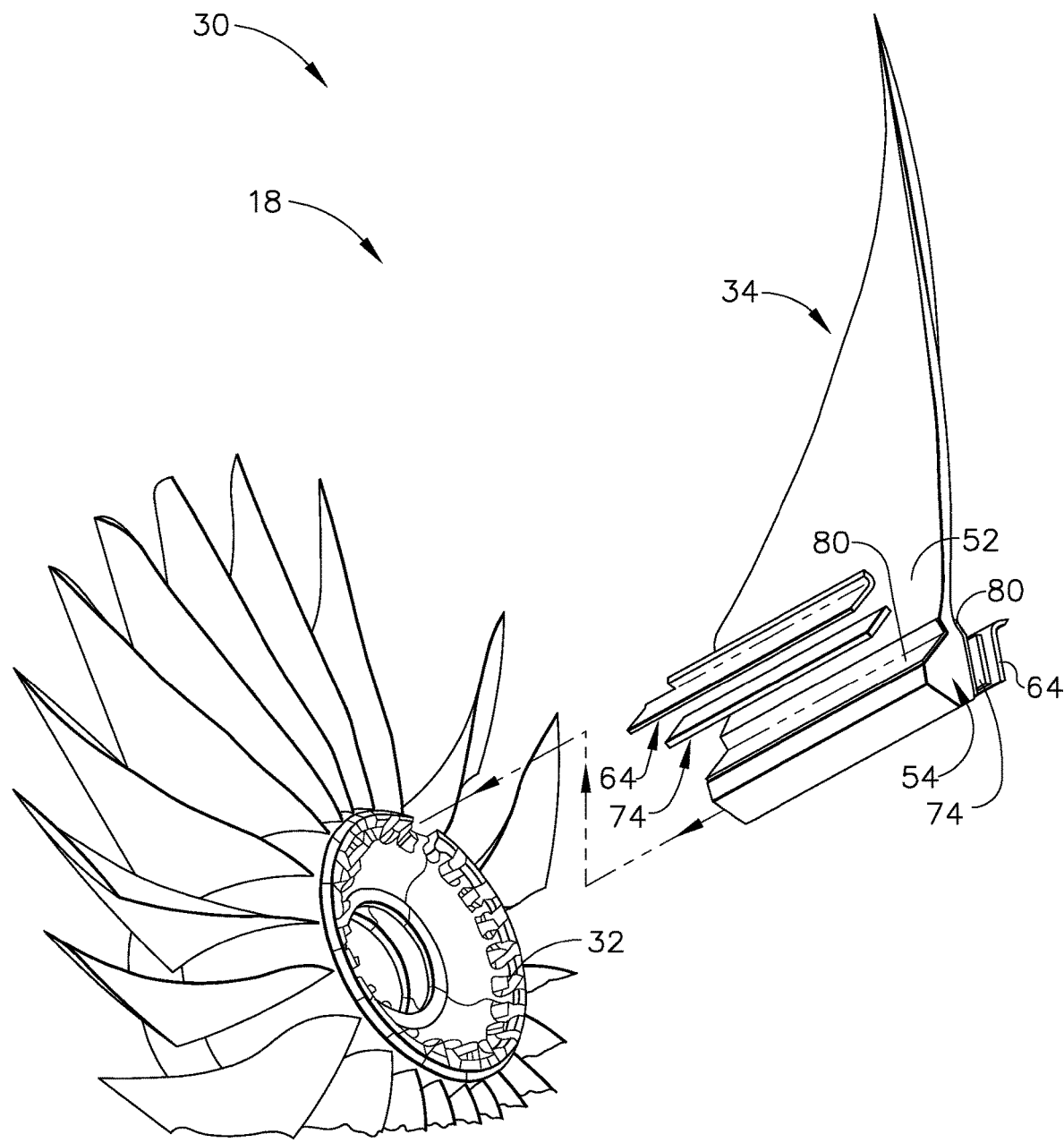
FIG. 2 is an isometric view of a fan disk and exploded airfoil.
Figure 3:
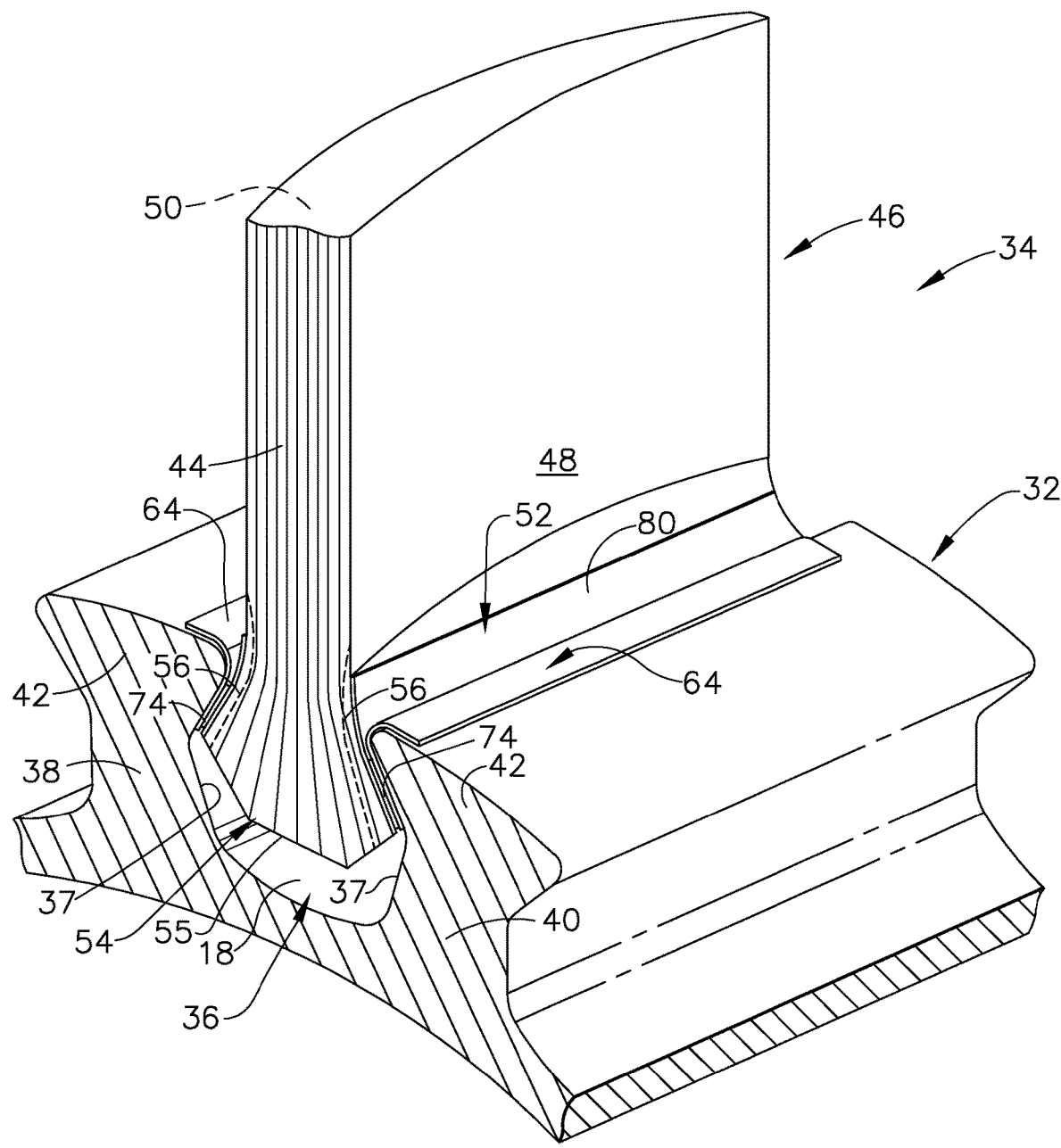
FIG. 3 is an isometric view of an airfoil with metal patch and rotor disk assembly.
Figure 4:
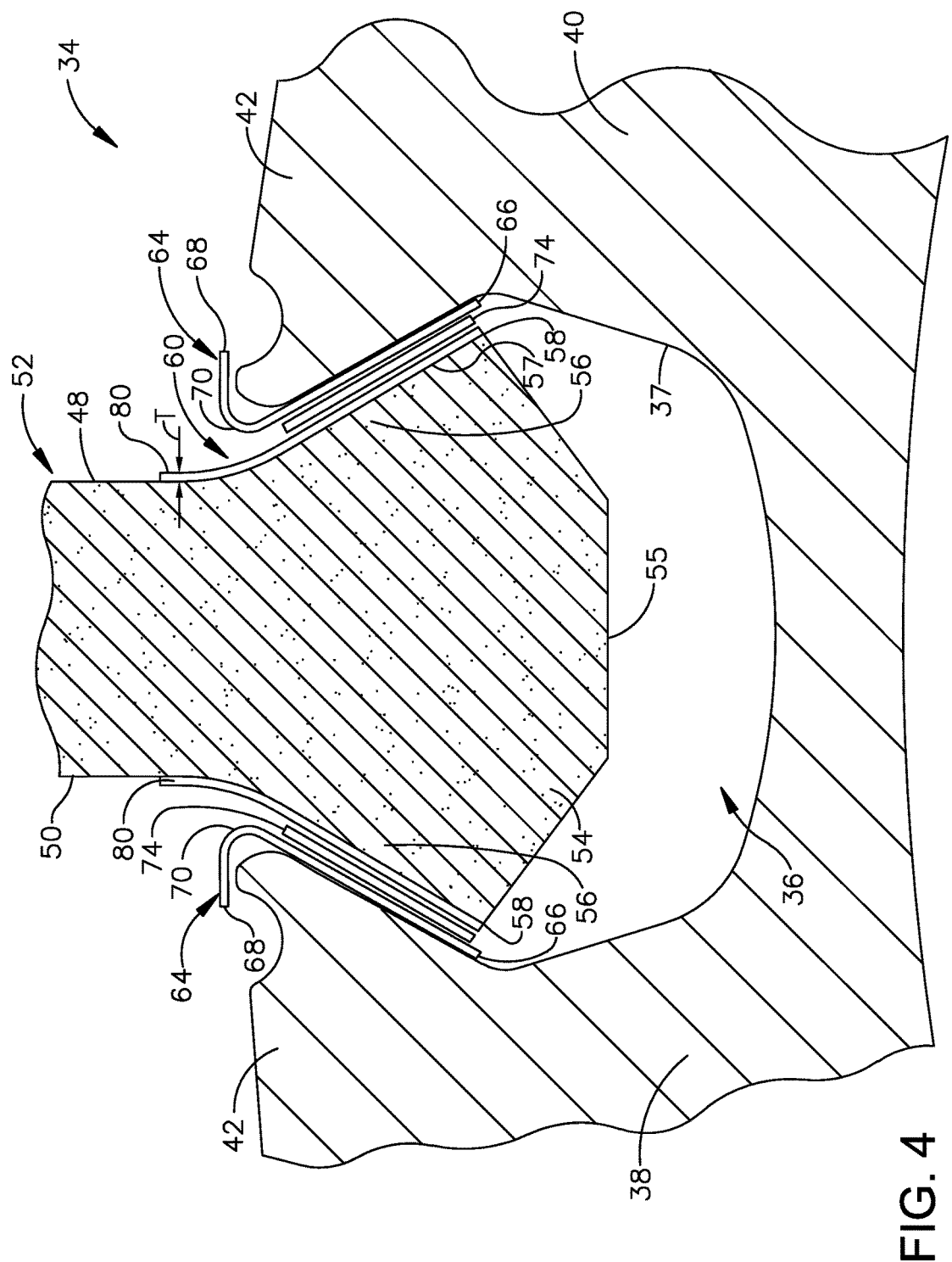
FIG. 4 is a section view of an exemplary airfoil with metal patch of FIG. 3.

Referring now to FIGS. 2-4, isometric views and a section view of exemplary airfoil assemblies 30 are depicted. According to the instant embodiment, a fan assembly 18 is depicted however, the constructions are capable of use in various portions of the engine. The airfoil assembly 30 is defined by a disk 32 and a plurality of airfoils 34 seated within the disk 32. According to the instant embodiment, the composite foil 34 may be a blade for use with a fan, compressor or turbine. The disk 32 is circular about the engine axis 26 (FIG. 1) and includes a plurality of dovetail slots 36 (FIG. 3) wherein each airfoil 34 is seated about the circumference of the disk 32. Each slot 36 is formed by first and second posts 38, 40 (FIG. 3) having reverse dovetails 42 (FIG. 3). Between the posts 38, 40, a slot wall 37 defines the engagement surface for the airfoil 34. The posts 38, 40 and reverse dovetail 42 capture a dovetail 54 of the airfoil 34 to retain the airfoil, for example fan blade, therein during operation.

The airfoil 34 includes a leading edge 44 which air flow first engages and an opposite trailing edge 46. The leading edge 44 and the trailing edge 46 are joined by opposed sides of the airfoil 34. On a first side of the airfoil 34 is a pressure side 48 where higher pressure develops. Laterally opposite the pressure side 48 is a suction side 50 extending from the leading edge 44 to the trailing edge 46 as well. The pressure side 48 is generally concave and the suction side 50 is generally convex. The suction side 50 of the airfoil 34 is longer than the pressure side 48 and, as a result, air or combustion gas flow has to move faster over this surface 50 than the surface defining the pressure side 48. As a result, lower pressure is created on the suction side 50 and higher pressure is created on the pressure side 48. This creates a lateral or tangential force on the airfoil 34.

Referring still to FIGS. 2-4, near the lower or radially inner end of the airfoil 34 are a shank 52 and the dovetail 54. The dovetail root 55 is sized to fit within the slot 36 and has a dimension in the circumferential direction that is greater than the uppermost or radially outer most dimension of the slot 36, between the reverse dovetails 42. Each dovetail 54 includes dovetail root 55 at a radially inner end up to a root end 58. Each dovetail 54 further includes opposed pressure pads 56 which are shaped to be carried by slot wall 37 of the dovetail slot 36. The pressure pads 56 extend generally from the root end 58 to a radial upper end of a root pressure face 57 at the shank 52. Each slot wall 37 cooperates with one of the pressure pads 56, and more specifically a lower pressure face 57 to retain the airfoil 34 during rotation of the disk 32 and airfoils 34. During such operation, the dovetail 54 and pressure pads 56 are designed to operate under the expected stresses, which are factored into the design, associated at least in part with centrifugal forces during engine operation.

The pressure face 57 may optionally be formed of a radially inner portion, closest to the root 55, and a radially outer portion, closest to the shank 52, wherein the radially outer portion diverges radially outwardly at a small angle of, for example, less than 10 degrees. This is generally referred to as "crowning" as will be understood by one skilled in the art and enable induced crush stresses caused by the centrifugal force loading to be disposed in both the pressure pads 56 and the plies of composite along the length of the face 57.

A shim 64 is disposed between the pressure pads 56 and the slot walls 37. The shim 64 extends radially upwardly along the slot wall 37 from a first end 66 and about a transition 70 to a second end 68 on the upper surface of the reverse dovetail 42. The second end 68 may extend further about the reverse dovetail 42. The shim 64 is retained on or above the upper surface of the reverse dovetail 42. The shim 64 provides a desired hardness and surface finish to improve performance while inhibiting wear of the slot wall 37. The shim 64 may be a replaceable component and provides wear properties for the reverse dovetail 42, for example where the posts 38, 40 and/or reverse dovetails 42 are formed of titanium alloy.

The shim 64 may be formed of various materials including, but not limited to, steel, titanium, titanium alloy or copper or copper alloys. Alternatively, the shim 64 may be a bi-metallic having a first material coated with a second material such as for non-limiting example, a steel or steel alloy coated with a copper or copper alloy on one or more sides. According to some embodiments of the bimetallic shim 64, a relatively hard iron based alloy is located on one side and a relatively soft copper or copper alloy is used on the opposite side. In such embodiment, the soft side is disposed opposite the slot wall 37 to prevent relative motion between the slot wall 37 and shim 64 and inhibiting degradation of the slot wall 37.

A wear strip 74 is located between the shims 64 and the pressure pads 56. The wear strip 74 provides a low friction coating between the shim 64 and pressure pad 56 so that motion takes place between the wear strip 74 and the shim 64 wherein the coefficient of friction is known. Additionally the airfoil dovetail stresses may be optimized.

Instant embodiments further comprise metal patch 80 in the area of the dovetail 54 between the root end 58 up to the shank 52. The metal patch 80 covers only a root pressure face 37 of the dovetail root 55. According to the embodiment of FIG. 4, the metal patch 80 is utilized with the shim 64 and the wear strip 74. The metal patch 80 may be formed of various materials, including, but not limited to, high-density material and may be formed of various sheet metals such as stainless steel, titanium, inconel or other known materials suitable for use in a gas turbine engine environment. Additionally, the metal patch 80 may be of constant thickness T or varying thickness T1 as illustrated in FIG. 4A.

The metal patches 80 may be adhesively bonded to the dovetail 54 and are disposed on both the pressure and suction sides 48, 50. The pressure face 57 provides large surface areas for adhesive or otherwise bonding the parts together. The metal patch 80 may be located at key stress concentration locations for use with various airfoil designs. Moreover, the metal patch 80 may decrease concentrations by re-distributing loads and reducing flatwise tensile stress, that is, normal to the layers of the composite. Additionally, the metal patch 80 allows for improvement of fatigue life of the airfoil 34. According to some tests, the estimated life improvement was an eight times increase.

The metal patch 80 extends as previously mentioned between the root end 58 to the shank 52, through the transition area or dovetail fillet 60 where the shank 52 joins the dovetail 54. The metal patch 80 may be formed with machined surfaces having high tolerance control. The metal patch 80 results in a reduction in stress concentration at the shank 52 and the dovetail region 54. According to numerical analysis of models, the stress reduction may be as much as twelve percent (12%). The metal patch 80 also results in improved composite airfoil 34. Finally, the metal patch 80 allows the opportunity to optimize the dovetail design and provide airfoil weight reduction.

Figure 5:
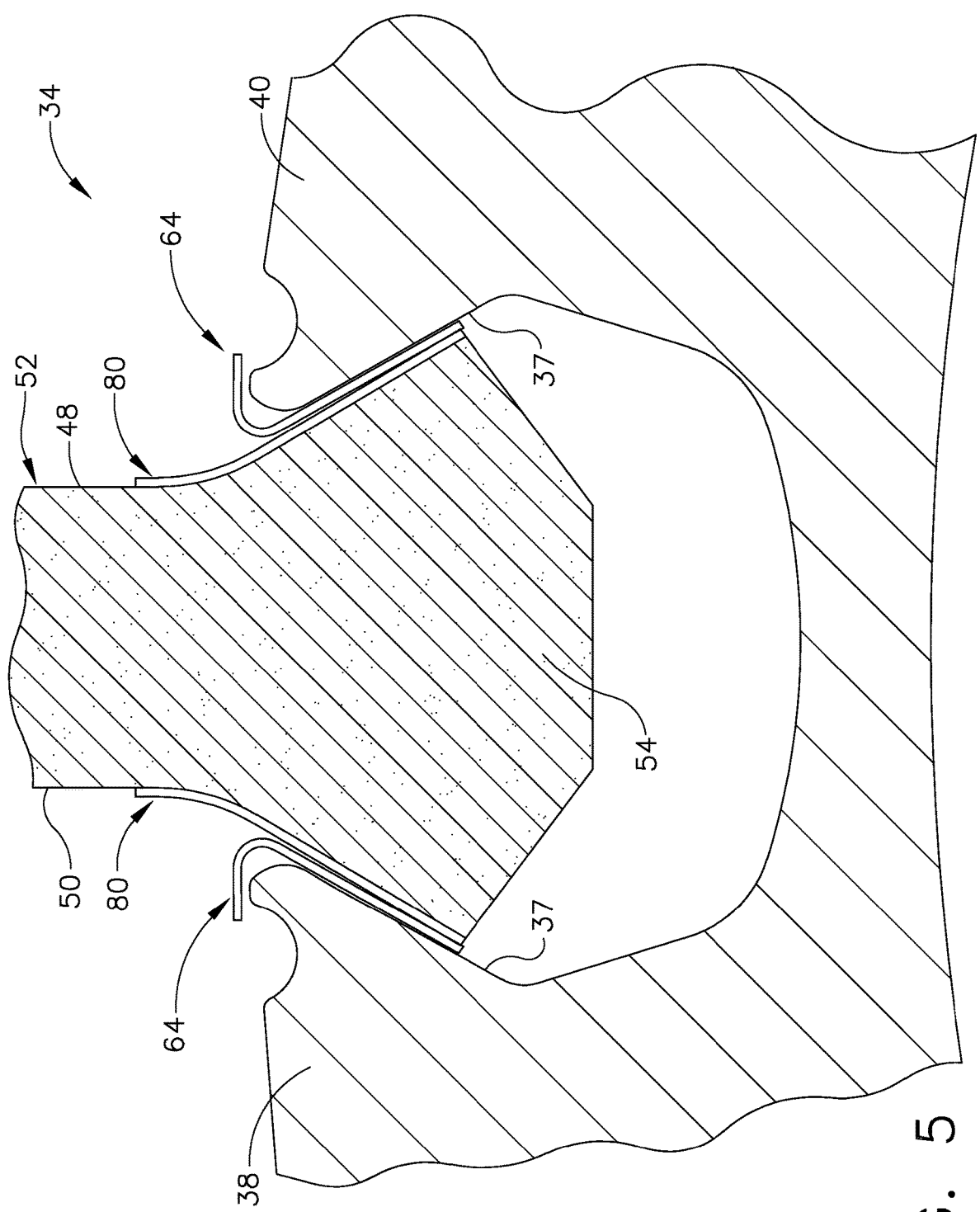
FIG. 5 is a section view of a second embodiment of an airfoil with metal patch; and, FIG. 6 is a section view of a third embodiment of an airfoil with metal patch.

Referring now to FIG. 5, a second embodiment is depicted wherein the metal patch 80 is utilized with the shim 64 and without the wear strip 74. In this embodiment, the metal patch 80 and/or the shim 64 may be formed of low coefficient material or alternatively, may be coated at adjacent corresponding surfaces with a low coefficient material. Either of these embodiments therefore do not require the use of a specific wear material distinct from the metal patch 80 and shim 64. As with previous embodiments, the metal patch 80 may be utilized on both the pressure and suction sides.

Figure 6:
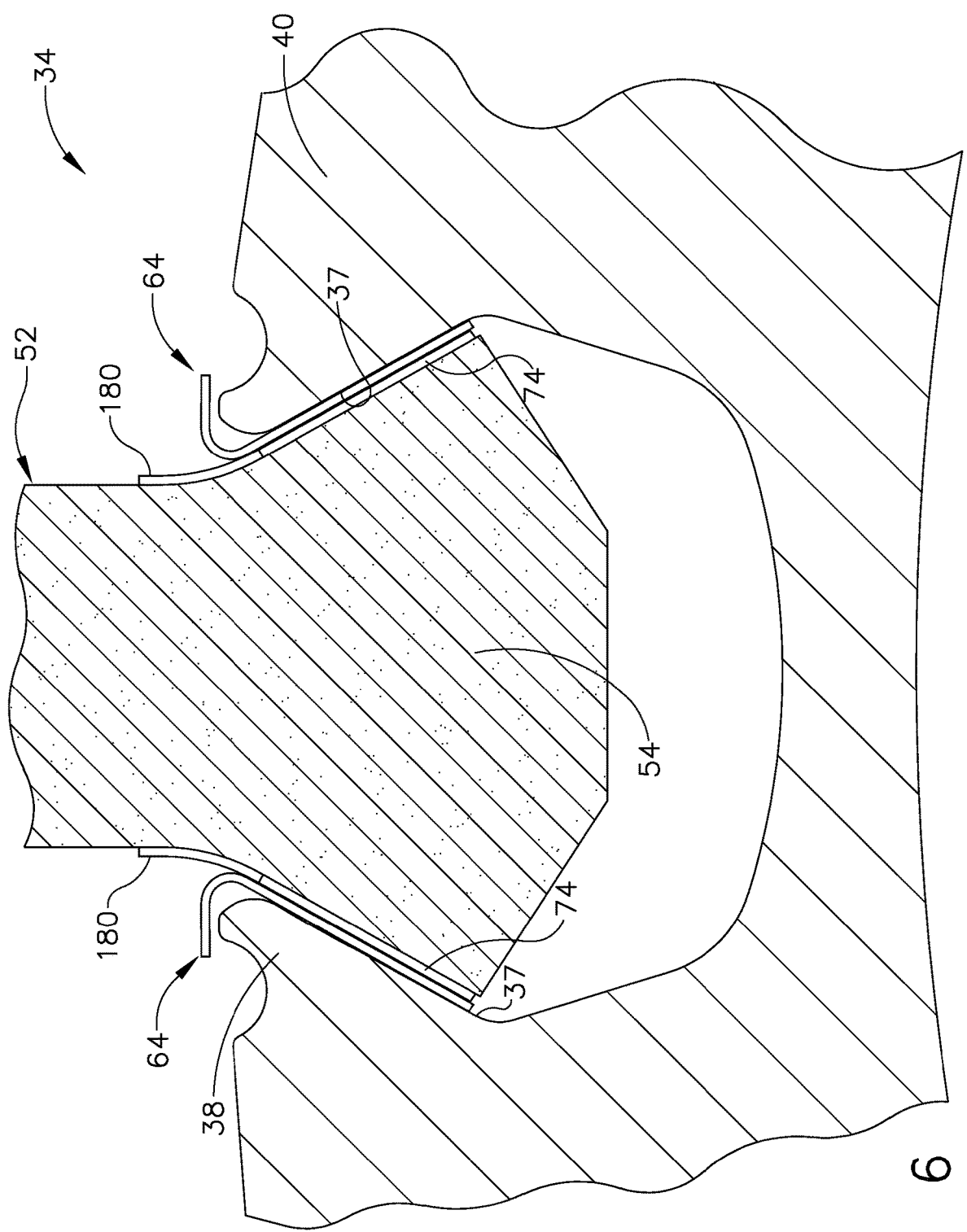

Referring now to FIG. 6, a third embodiment is depicted wherein a metal patch 180 is located in the transition area 60 (FIG. 4) or dovetail fillet between the shank 52 and dovetail 54. A wear strip 74 extends between the root end 58 (FIG. 4) up to near the dovetail fillet 60. Within this fillet 60 is the metal patch 180 extending up to shank 52. So, as opposed to the previous embodiments, the metal patch 180 is shorter than the embodiments of FIGS. 4 and 5. The shim 64 is utilized in this embodiment as well, opposite the wear strip 74 and metal patch 180.

While certain embodiments are described and depicted, it should be understood from the instant disclosure that the composite airfoil with metallic patch may be utilized with turbine blades, compressor blades, fan blades or stator blades of compressors or turbines within gas turbine engines.

Further, while multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially" of shall be closed or semi-closed transitional phrases, respectively, as set forth in the United States Patent Office Manual of Patent Examining Procedures, Section 2111.03.

What is claimed is:

1. A composite airfoil assembly comprising:
    a composite airfoil including a leading edge and a trailing edge;
    a pressure side and a suction side extending between said leading edge and said trailing edge;
    a tip at a radial outer end of said airfoil;
    a shank at a radial inner end of said airfoil; and
    a dovetail connected to said shank;
    a disk having a plurality of dovetail slots, each formed and defined by first and second posts having reverse dovetails, the first and second posts and reverse dovetails capturing the dovetail of the airfoil to retain the airfoil during operation; and
    a metal patch bonded to a pressure pad of said dovetail and extending between a root end of a root of said dovetail and said shank, and said metal patch extending inwardly over and no further than a root pressure face of said root;
    a shim disposed between said dovetail and disk; and
    a wear strip disposed between the shim and the patch;
    such that the metal patch, wear strip, and shim form a 3-layer structure between the dovetail and disk and relative motion is permitted between the wear strip and shim.

2. The composite airfoil assembly of claim 1 further wherein said metal patch comprises a first metal patch 80 on said suction side and a second metal patch on said pressure side.

3. The composite airfoil assembly of claim 1, said metal patch located in a transition region between said dovetail and said shank.

4. The composite airfoil assembly of claim 2, said first and second metal patches being bonded to said dovetail.

5. The composite airfoil assembly of claim 1, said metal patch being of constant thickness.

6. The composite airfoil assembly of claim 1, said metal patch being of varying thickness.

7. The composite airfoil assembly of claim 1, said metal patch being a titanium alloy.

8. The composite airfoil assembly of claim 1, said airfoil being a fan blade.

9. The composite airfoil assembly of claim 1, said airfoil being a turbine blade.

10. The composite airfoil assembly of claim 1, said airfoil being a compressor blade.

11. The composite airfoil assembly of claim 1, said shim being formed of a single material.

12. The composite airfoil assembly of claim 1, said shim being formed of two materials.

13. The composite airfoil assembly of claim 12, said shim having a soft side and a hard side.

14. The composite airfoil assembly of claim 1 further comprising said metal patch extending inwardly up to an inner end of said root pressure face.

\* \* \* \* \*